US011947319B2

(12) United States Patent
Perruchoud et al.

(10) Patent No.: US 11,947,319 B2
(45) Date of Patent: Apr. 2, 2024

(54) CASING OF A DEWAR DEVICE COMPRISING AN ELEMENT FOR CONNECTING A WATCH CASE

(71) Applicant: OMEGA SA, Biel/Bienne (CH)

(72) Inventors: Gérald Perruchoud, La Neuveville (CH); Florent Cosandier, Neuchâtel (CH)

(73) Assignee: OMEGA SA, Biel/Bienne (CH)

( * ) Notice: Subject to any disclaimer, the term of this patent is extended or adjusted under 35 U.S.C. 154(b) by 266 days.

(21) Appl. No.: 17/519,020

(22) Filed: Nov. 4, 2021

(65) Prior Publication Data

US 2022/0179369 A1 Jun. 9, 2022

(30) Foreign Application Priority Data

Dec. 9, 2020 (EP) .................................... 20212867

(51) Int. Cl.

*G04B 43/00* (2006.01)
*G04B 37/00* (2006.01)
*G04B 37/02* (2006.01)
*G04B 37/05* (2006.01)
*G04G 17/04* (2006.01)

(52) U.S. Cl.

CPC ........... *G04B 43/005* (2013.01); *G04B 37/00* (2013.01); *G04B 37/02* (2013.01); *G04B 37/05* (2013.01); *G04G 17/045* (2013.01)

(58) Field of Classification Search

CPC .... G04B 43/005; G04B 37/05; G04B 17/045; G04B 37/02; G04B 37/00; G04G 17/08; G04G 17/045

See application file for complete search history.

(56) References Cited

U.S. PATENT DOCUMENTS

| | | | | | |
|---|---|---|---|---|---|
| 29,210 | A * | 7/1860 | Woodworth | G04B 37/02 | 368/286 |
| 872,795 | A * | 12/1907 | Burger | B65D 1/0215 | 65/153 |
| 3,030,763 | A * | 4/1962 | Klingenberg | G04B 39/02 | 368/291 |

(Continued)

FOREIGN PATENT DOCUMENTS

| | | |
|---|---|---|
| CN | 203 747 909 U | 7/2014 |
| CN | 106 325 041 A | 1/2017 |
| FR | 2 752 959 A1 | 3/1998 |

OTHER PUBLICATIONS

Google image search results for “lattice”, “trellis”, and “lattice versus trellis”, generated Sep. 21, 2023 (Year: 2023).*
European Search Report for EP 20 21 2867 dated May 21, 2021.

*Primary Examiner* — Edwin A. Leon
*Assistant Examiner* — Sean R Brannon
(74) *Attorney, Agent, or Firm* — Sughrue Mion, PLLC

(57) ABSTRACT

A dewar device (1) for mechanical and/or functional components (2) of a watch (3), the device (1) being provided with a bracelet and a casing (4) including an enclosure (5) wherein it is possible to arrange a case (6) of the watch (3) and at least one reversible connecting element (7) fixing the watch (3) case (6) in the enclosure (5) of the casing (4) while keeping it remote from all the elements (10*a*, 10*b*, 10*c*) of the casing (4) defining this enclosure (5), the at least one reversible connecting element (7) being provided with a body forming a structure (8) including at least one recessed area (9).

12 Claims, 1 Drawing Sheet

(56) References Cited

U.S. PATENT DOCUMENTS

| | | | | |
|---|---|---|---|---|
| 3,740,944 | A * | 6/1973 | Chopard | G04B 43/005<br>368/286 |
| 7,794,805 | B2 * | 9/2010 | Aumaugher | F16L 59/08<br>428/34.6 |
| 8,991,636 | B2 * | 3/2015 | Verhulst | F17C 13/001<br>220/23.89 |
| 9,279,540 | B2 * | 3/2016 | Verhulst | F17C 13/001 |
| 9,877,894 | B2 * | 1/2018 | Wengreen | A61J 1/18 |
| 2012/0155230 | A1 | 6/2012 | Patt | |
| 2016/0251140 | A1 * | 9/2016 | Wengreen | B65B 63/08<br>62/457.2 |

* cited by examiner

CASING OF A DEWAR DEVICE COMPRISING AN ELEMENT FOR CONNECTING A WATCH CASE

CROSS-REFERENCE TO RELATED APPLICATIONS

This application claims priority to European Patent Application No. 20212867.4 filed Dec. 9, 2020, the entire contents of which are incorporated herein by reference.

TECHNICAL FIELD

The invention relates to a Dewar device for mechanical and/or functional components of a watch in particular adapted to operate under extreme temperatures, the Dewar device comprising at least one connecting element for the arrangement of a case of the watch in its casing.

TECHNOLOGICAL BACKGROUND

An electronic watch conventionally comprises a bracelet and a watch case including several electrical or electronic components. It is known in the prior art that some of these components cannot withstand extreme temperatures, and cease to operate properly at these temperatures. Typically, Liquid Crystal Display LCD screens using light-emitting diodes or quartz tolerate temperatures not exceeding 80° C. (degrees Celsius) approximately, and not falling below 0° C. However, in particular environments such as, for example, space or lunar missions, temperatures can frequently reach values of the order of substantially −150° C. to +125° C.

There is therefore a need to be able to use a watch, in particular an electronic watch, in environments where such extreme temperatures can prevail.

SUMMARY OF THE INVENTION

To this end, the invention relates to a Dewar device for mechanical and/or functional components of a watch, said device being provided with a bracelet and a casing including an enclosure wherein it is possible to arrange a case of said watch and at least one reversible connecting element fixing said watch case in said enclosure of the casing while keeping it remote from all the elements of the casing defining this enclosure, said at least one reversible connecting element being provided with a body forming a structure including at least one recessed area.

Thanks to the Dewar device formed by the casing and the watch case, the mechanical and/or functional components of the watch are protected from any extreme temperatures between −150 and +125 degrees Celsius that may prevail outside said device. In addition, said at least one connecting element ensuring the fixing of the watch case to the casing contributes to ensuring very good thermal insulation of the case by preventing any heat loss of this watch case 6, in particular by radiation. Thus, such a Dewar device allows to use mechanical and/or functional components in contexts and environments where temperatures can be extreme, such as for example during space exploration missions such as the exploration of the planet Mars or the Moon. This also allows to rationalise costs as well as to maintain a reasonable complexity for the components used in watches approached for such missions.

In other embodiments:

- the structure comprises a plurality of substantially different or strictly different recessed areas;
- the structure comprises a plurality of recessed areas having substantially similar or strictly similar shapes;
- the structure is a lattice structure;
- said structure is a trellis structure;
- at least one connecting element provides a reversible fixing of the watch case to an inner peripheral wall of the enclosure of the casing;
- said at least one connecting element provides a reversible fixing of the watch case to a back of the casing;
- said at least one connecting element is the only connecting element ensuring the reversible fixing of the watch case in the enclosure of the casing;
- said enclosure is under vacuum or almost under vacuum;
- the casing comprises a crystal the surface of which is substantially greater or strictly greater than a crystal of the watch case;
- a crystal of the watch case is disposed opposite a crystal of the casing when the watch case is arranged in said enclosure;
- the device comprises a middle part on which said bracelet is fixed;
- said casing elements defining said enclosure are a crystal, an inner peripheral wall of a middle part and a back of this casing.

BRIEF DESCRIPTION OF THE FIGURES

Other peculiarities and advantages will emerge clearly from the description which is given below, in an indicative and non-limiting manner, with reference to the appended figures, wherein.

DETAILED DESCRIPTION OF THE INVENTION

Figure 1:
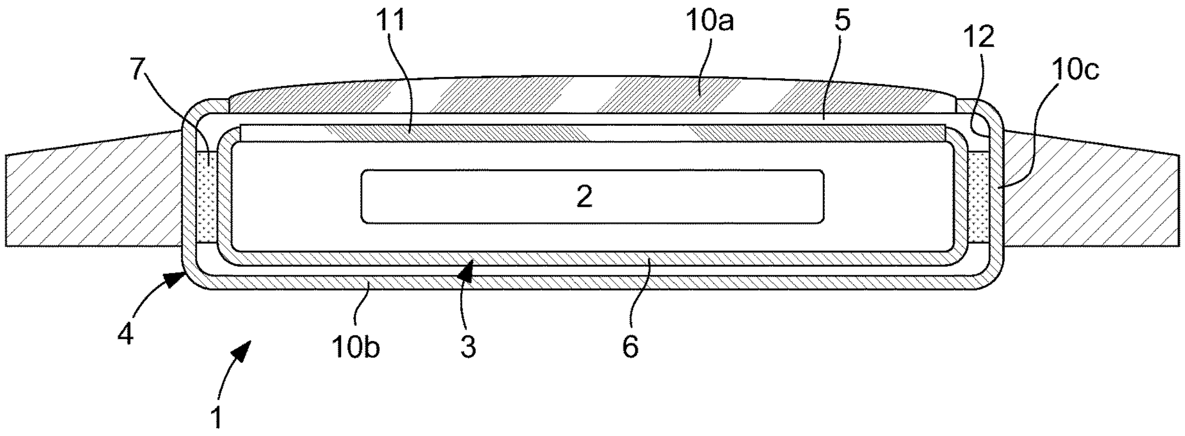
FIG. 1 is a sectional view of a schematic representation of a Dewar device for mechanical and/or functional components of a watch, according to one embodiment of the invention, and FIG. 2 a view on a larger scale of a body forming a structure comprising at least one recessed area belonging to a reversible connecting element capable of fixing a watch case in a casing of said device, depending on the embodiment of the invention.

FIG. 1 shows an isothermal horological device 1 for mechanical and/or functional components 2 of a watch 3 also called Dewar horological device or more simply in the remainder of the description “Dewar device”. Such a Dewar device 1 for mechanical and/or functional components 2 of a watch 3 is able to participate in imparting good thermal insulation to mechanical and/or functional components 2 of the watch 3, a case 6 of which must be arranged in this casing 4 of the device 1 in order to ensure such insulation for these components 2. In other words, this Dewar device 1 is in particular formed by the combination of its casing 4 and of the watch 3 case 6 in order to achieve thermal insulation suitable for these mechanical and/or functional components 2. In this configuration, the watch 3 case 6 is arranged in an enclosure 5 while being maintained remote or at a distance from all the elements 10*a* to 10*c* of the casing 4 defining this said enclosure 5, namely a crystal 10*a*, an inner peripheral wall 12 of a middle part 10*c* and a back 10*b* of this casing 4. It will be noted that this inner peripheral wall 12 is also that of said enclosure 5.

This remoteness or this distance is configured from at least one connecting element 7 that will be described below, to (or to participate in) reduce (reducing) or even eliminate (eliminating) any thermal conduction between the inner peripheral wall of the middle part 10*c* and/or the back 10*b* and/or the crystal 10*a* with the watch 3 case 6 in particular with an outer face of this case 6. This outer face includes the outer surfaces of the crystal, the middle part and the back of this watch 3 case 6.

It will be noted that such a case 6 is comprised in a watch 3 which can be an electronic watch, for example a quartz watch or else a mechanical watch.

The mechanical and/or functional components 2 of the watch 3, mentioned above, comprise in a non-limiting and non-exhaustive manner: a watch movement, a dial, hands, rings, seals and/or electronic and/or electrical components 2. It will in particular be noted that such electronic and/or electrical components include, for example, a display device, a processor, a memory, a power storage component, a motor, an integrated circuit and an electronic oscillator, etc.

It is therefore understood that in this configuration, this Dewar device 1 has the same properties and features as a Dewar tube/vessel well known in the prior art. As previously mentioned, the properties and features of this Dewar device 1 help to give it good thermal insulation with regard to particularly extreme temperatures that may prevail in the external environment wherein such a device 1 can be located.

In this context, this device 1 therefore comprises the casing 4 which includes the middle part 10*c* on which is mounted a bracelet allowing a user of this device 1 to wear it. This casing 4 also includes the crystal 10*a* and the back 10*b* mentioned above. In this device 1, it will be noted that the crystal 10*a* preferably comprises a surface which is substantially greater or strictly greater than a crystal 11 of the watch 3 case 6.

As already seen, the crystal 10*a*, the middle part 10*c* and the back 10*b* of this device 1 together define the enclosure 5 of this casing 4 which is capable of receiving the watch 3 case 6. These three elements 10*a* to 10*c* of the casing 4, the middle part 10*c*, the crystal 10*a* and the back 10*b* can be separate elements which are joined together to construct this enclosure 5. Alternatively, the middle part 10*c* and the back 10*b* of the casing 4 can together form a single piece, said single piece defining an opening opposite the back 10*b* which is capable of being closed by the crystal 10*a* in a reversible and sealed manner. In another alternative manner, the middle part 10*c* and the crystal 10*a* of the casing 4 can together form a single piece, said single piece defining an opening opposite the crystal 10*a* which is capable of being closed by the back 10*b*, also in a reversible and sealed manner.

The middle part 10*c* and the back 10*b* are preferably made in a non-limiting and non-exhaustive manner of a metal material, of glass or of thermosetting or thermoplastic polymer resins reinforced with carbon or glass fibres or else of ceramic materials. It will be noted that when the middle part 10*c* and the back 10*b* are transparent or semi-transparent, being for example made of glass, the peripheral wall 12 of the middle part 10*c* and the inner face of the back 10*b* can be plated with a metal reflective coating or the like, such as, for example, a layer of silver.

In addition, the device 1 may comprise an interferometric filter arranged on an external face of the casing 4, namely on an external peripheral wall of the middle part 10*c* and/or the external faces of the crystal 10*a* and of the back 10*b* of this watch 3 case 6. This interferometric filter can be a grid or a trellis forming a plating on this external face of the casing 4. This grid or trellis has a mesh whose dimensions are such that they only allow certain predetermined wavelengths of the electromagnetic spectrum to pass, typically the wavelengths of the visible domain. It should be noted that such a filter contributes to blocking heat loss by radiation, in particular blocking infrared waves while allowing a reading of the watch dial while allowing visible wavelengths generally less than about 600 nm to pass.

Furthermore, in this device 1, when the watch 3 case 6 is arranged in the enclosure 5 of the casing 4, the space defined between this case 6 and the inner peripheral wall 12 of the middle part 10*c*, the back 10*b* and the crystal 10*a* is empty of material or almost empty. In other words, the enclosure 5 is under vacuum or almost under vacuum.

With the aim of ensuring maintaining the watch 3 case 6 in this enclosure 5, the Dewar device 1 and in particular the casing 4 comprises at least one connecting element 7 providing a reversible fixing of the watch 3 case 6 on the inner peripheral wall 12 and/or on the back of this casing 4. This connecting element 7 which is also called "reversible connecting element" comprises two ends, a first of which is connected to the casing 4. Such a connecting element 7 is configured to participate in the reduction of thermal conduction between the casing 4 and the watch 3 case 6. As will be seen below, the body of this element 7 has a particular structure 8 which contributes to ensuring a reduction of thermal losses to the external environment of the Dewar device and therefore to ensure an internal temperature in the watch 3 case 6 which is stable. In other words, a temperature which authorises or allows optimal operation of the components 2 of the watch 3.

More specifically, this first end can be connected in manner which is:

- removable on the inner peripheral wall 12 and/or on the back of this casing 4, for example by clipping or interlocking;
- non-removable, either fixed or irremovable, on this inner peripheral wall 12 and/or on this back of the casing 4.

It will be noted that when the first end of this connecting element 7 is irremovably connected to the inner peripheral wall 12 and/or to the back 10*b*, it is then fixed to the latter two, for example by gluing or else by welding.

The second end of this connecting element 7 which is intended to be connected to the watch 3 case 6, is preferably removably connected. For this purpose, this second end includes a fixing area which is configured to be connected to an attachment area of the watch 3 case 6 in place of the bracelet of this watch 3. By way of example, this fixing area of this second end is able to ensure a reversible fixing on a bar comprised in this attachment area of this watch 3 or to replace this bar.

This connecting element 7 is provided with a body forming/comprising a structure 8 including at least one recessed area 9. This recessed area 9 is an empty part of the body of this connecting element 7 or else a part which has been recessed from the material constituting the rest of the body of this element 7. In other words, each recessed area 9 is a through opening, a blind opening, a slot or else a perforated area comprised in the body of this element 7. It is therefore understood that the structure 8 of such a connecting element 7 comprises said at least one recessed area 9 as well as a non-recessed area of this body.

Figure 2:
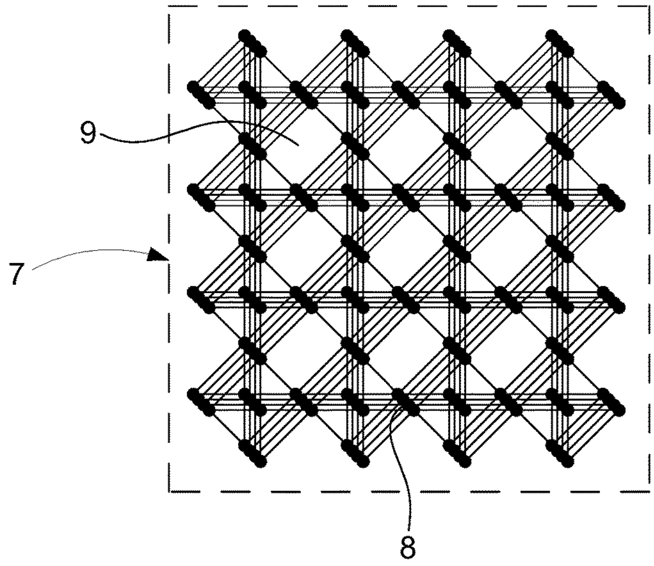

With reference to FIG. 2, such a structure 8 can comprise a plurality of recessed areas. In this structure 8, the recessed areas have similar shapes. It is understood that in other variants, the recessed areas may have different shapes. In this context, such a structure 8 comprising several recessed areas can be a lattice structure 8 such as a microlattice structure or a nanolattice structure, or a trellis structure 8 which may also be called a triangulated system.

Such a structure 8 of the connecting element 7 improves the resistance of the watch 3 case 6 in the casing 4 by having very good mechanical resistance to any stresses that such a connecting element 7 is liable to undergo in the framework of the use of the Dewar device 1 in particular during the application of an acceleration, a deceleration and/or a sudden/violent/abrupt change of direction undergone by this Dewar device 1 for example during an impact. Moreover, it will be noted that such a structure 8 gives this connecting element 7 greater mechanical strength than a connecting element of the prior art which would have a mass substantially similar or strictly similar to the connecting element 7 of the present invention.

In addition, this structure 8 is able to reduce the capacity of this connecting element 7 to diffuse heat between the inner peripheral wall 12 and/or the back 10*b* where the first end of this element 7 and the watch 3 case 6 are fixed, that is to say to reduce or limit the thermal conductivity. In such a structure 8, the reduced section of one or more parts of the non-recessed area and/or the length of the thermal path(s) defined by this or these parts of the non-recessed area between the two ends of this connecting element 7, participate(s) in limiting or even preventing any heat loss from the watch 3 case 6.

In order to improve these advantages provided by such a structure to the connecting element 7, the materials used for the manufacture of this structure preferably also have low thermal conductivity and/or high mechanical strength properties. For example, these materials can comprise: steel, titanium, ceramic or polymers.

In the present embodiment shown in FIG. 1, the casing 4 preferably comprises two reversible connecting elements 7 fixing the watch 3 case 6 on the inner peripheral wall 12 of the middle part 10*c* of this casing 4. These connecting elements 7 keep the watch 3 case 6 at a distance from the crystal 10*a* and from the back 10*b* of the casing 4 and also from the inner peripheral wall 12 of the middle part 10*c* which is that of the enclosure 5. In other words, these two connecting elements 7 avoid any direct contact between the watch 3 case 6 and the crystal 10*a*, the back 10*b* and this inner peripheral wall 12 of the middle part 10*c*.

Such a distance is configured according to:

- the position of the first end on the inner peripheral wall 12 of the middle part 10*c* between the crystal 10*a* and the back 10*b* of the casing 4, and/or
- the shape of each connecting element 7, in other words the shape of the body forming the structure 8 defined/extending between the two ends of this connecting element 7, and/or
- the length of the body forming the structure 8 extending between these two ends of the connecting element 7.

In addition, these connecting elements 7 contribute to disposing the watch 3 case 6 in this casing 4 so that the crystal 11 of this watch 3 case 6 is arranged opposite the crystal 10*a* of the casing 4 so that the information comprised on the dial and/or the display interface of this watch 3 can be perceived through the transparent crystal 10*a* of the casing 4 by the user wearing the Dewar device 1.

Thus, such a Dewar device 1 provides the mechanical and/or functional components 2 of the watch 3 with very good thermal insulation vis-à-vis the external environment by reducing or even preventing heat loss by radiation of the components arranged in the watch case 6 for a long time. Thus, when the temperature outside the device 1 reaches extreme values, typically of the order of −125 to +125° C., the temperature inside the enclosure 5 in turn remains substantially equal to the temperature present in the watch 3 case 6 when it is arranged in the casing 4, typically of the order of 20° C. It should be noted that regardless of the temperature conditions prevailing in the environment of the Dewar device 1, the temperature present in the watch 3 case 6 is a temperature which does not hinder the proper operation of the watch. This temperature is maintained over a period of time which is 5 to 18 times greater than the period during which such a watch case would be able to preserve an operating temperature of its components 2 by being located directly in such an environment where such particularly extreme temperatures prevail (that is to say by being located outside the casing of the Dewar device). It can thus be seen that such a configuration allows to protect the mechanical and/or functional components 2 of the watch 3, as well as to participate in ensuring their operation in an optimal manner in extreme external temperature conditions.

The invention claimed is:

1. A Dewar device (1) for mechanical and/or functional components (2) of a watch (3), said device (1) being provided with a bracelet and a casing (4) including an enclosure (5) configured to receive a case (6) of said watch (3) and at least one reversible connecting element (7) fixing said watch case (6) in said enclosure (5) of the casing (4) while keeping said watch remote from all elements (10*a*, 10*b*, 10*c*) of the casing (4) defining said enclosure (5), said at least one reversible connecting element (7) configured such that said watch case (6) may be inserted and then removed, said at least one reversible connecting element (7) including a body forming a structure (8) including at least one recessed area (9), wherein at least one end of said at least one reversible connecting element (7) is fixed by a clipping or an interlocking.

2. The Dewar device (1) according to claim 1, wherein said structure (8) comprises a plurality of substantially different recessed areas (9).

3. The Dewar device (1) according to claim 1, wherein said structure (8) comprises a plurality of recessed areas (9) having substantially similar shapes.

4. The Dewar device (1) according to claim 1, wherein said structure (8) is a lattice structure.

5. The Dewar device (1) according to claim 1, wherein said at least one connecting element (7) provides said reversible connection of the watch (3) case (6) to an inner peripheral wall (12) of the enclosure (5) of the casing (4).

6. The Dewar device (1) according to claim 1, wherein only said at least one connecting element (7) ensures the reversible fixing of the watch (3) case (6) in the enclosure (5) of the casing (4).

7. The Dewar device (1) according to claim 1, wherein said enclosure (5) is under vacuum.

8. The Dewar device (1) according to claim 1, wherein the casing (4) comprises a crystal (10*a*) the surface of which is substantially greater than a crystal (11) of the watch (3) case (6).

9. The Dewar device (1) according to claim 1, wherein a crystal (11) of the watch (3) case (6) is disposed opposite a crystal (10*a*) of the casing (4) when the watch (3) case (6) is arranged in said enclosure (5).

10. The Dewar device (1) according to claim 1, further comprising a middle part (10*c*) on which said bracelet is fixed.

11. The Dewar device (1) according to claim 1, wherein said casing (4) elements defining said enclosure (5) are a crystal (10*a*), an inner peripheral wall (12) of a middle part (10*c*) and a back (10*b*) of said casing (4).

12. A Dewar device (1) for mechanical and/or functional components (2) of a watch (3), said device (1) being provided with a bracelet and a casing (4) including an enclosure (5) configured to receive a case (6) of said watch (3) and at least one reversible connecting element (7) fixing said watch case (6) to said enclosure (5) of the casing (4) while keeping said watch remote from all elements (10*a*, 10*b*, 10*c*) of the casing (4) defining said enclosure (5), said at least one reversible connecting element (7) configured such that said watch case (6) may be inserted and then removed, said at least one reversible connecting element (7) including a body forming a structure (8) including at least one recessed area (9), wherein at least one end of said at least one reversible connecting element (7) is mechanically fixed to said case.

* * * * *